July 7, 1964 HASHEM NARAGHI 3,139,859
EGG GATHERING APPARATUS
Filed Aug. 27, 1962 2 Sheets-Sheet 1

INVENTOR.
HASHEM NARAGHI
BY
Merl E. Sceales
ATTORNEY

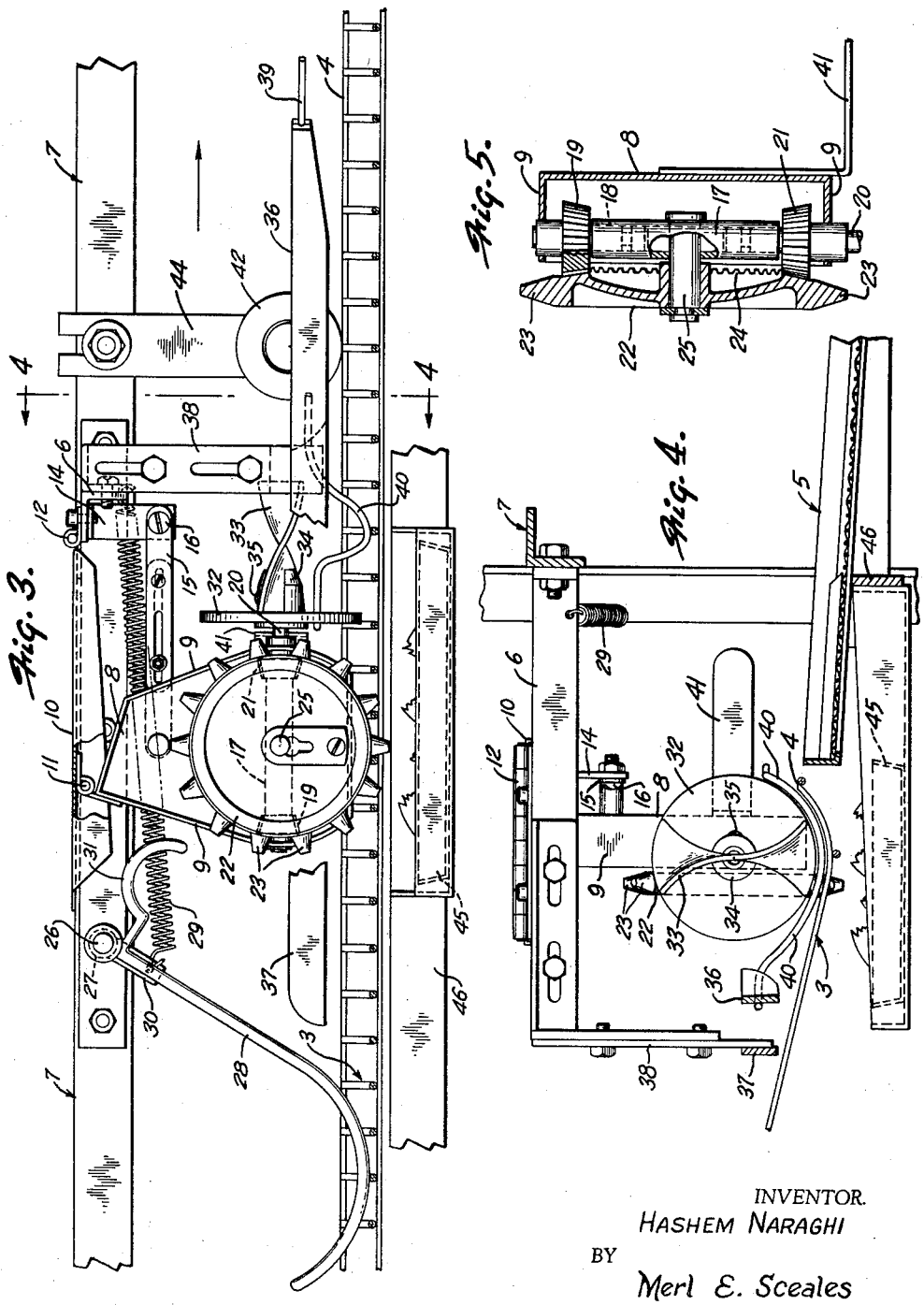

United States Patent Office 3,139,859
Patented July 7, 1964

3,139,859
EGG GATHERING APPARATUS
Hashem Naraghi, P.O. Box 7, Escalon, Calif.
Filed Aug. 27, 1962, Ser. No. 219,455
8 Claims. (Cl. 119—48)

This invention relates to egg gathering apparatus and particularly has reference to apparatus employed to gather eggs from stacked wire cages within which laying hens are confined.

In general, the invention comprises an egg gatherer or sweep having preferably an S-shaped blade which sweeps the eggs into receiving trays which are motor driven past the cages in which the hens are confined. The sweep is rotated by a shaft geared to a wheel having teeth which overlie and engage a wire tray-like ledge extending outside and along the stacked wire cages. As the trays and sweep are driven past the cages, the teethed wheel of the egg sweep is rotated by the engagement of the teeth with the wire ledge with a resulting rotation of the wheel, gears, shaft and S-blade making up the egg sweep mechanism. A roller leveler is also provided as part of the egg gathering apparatus to maintain a fixed relatonship between the ledge and the egg gatherer and a guide bar extends ahead of the egg sweep to guide the eggs to the sweep for discharge into the egg receiving trays.

One of the problems in sweeping or gathering eggs into the trays has been the tendency for some of the eggs to break as they are engaged by the rear or backing wall of sweep blade. This problem has been overcome by providing a spring like lifter guide of a wire or small diameter rod ahead of the sweep blade which prevents the eggs from striking the rear wall of sweep, and directs the eggs to a position where the eggs are only engaged by the outer ends of the sweep blade to move them into the receiving trays.

Other objects and advantages of the invention will appear in connection with the following description of the drawings in which:

FIG. 3 is a side elevational view of the egg gathering apparatus looking outwardly from the cages in which the hens are confined;

FIG. 4 is a section taken on line 4—4 of FIG. 3; and

FIG. 5 is a section taken through the sweep wheel and the gears and shaft driven therefrom.

Figures 1, 2:
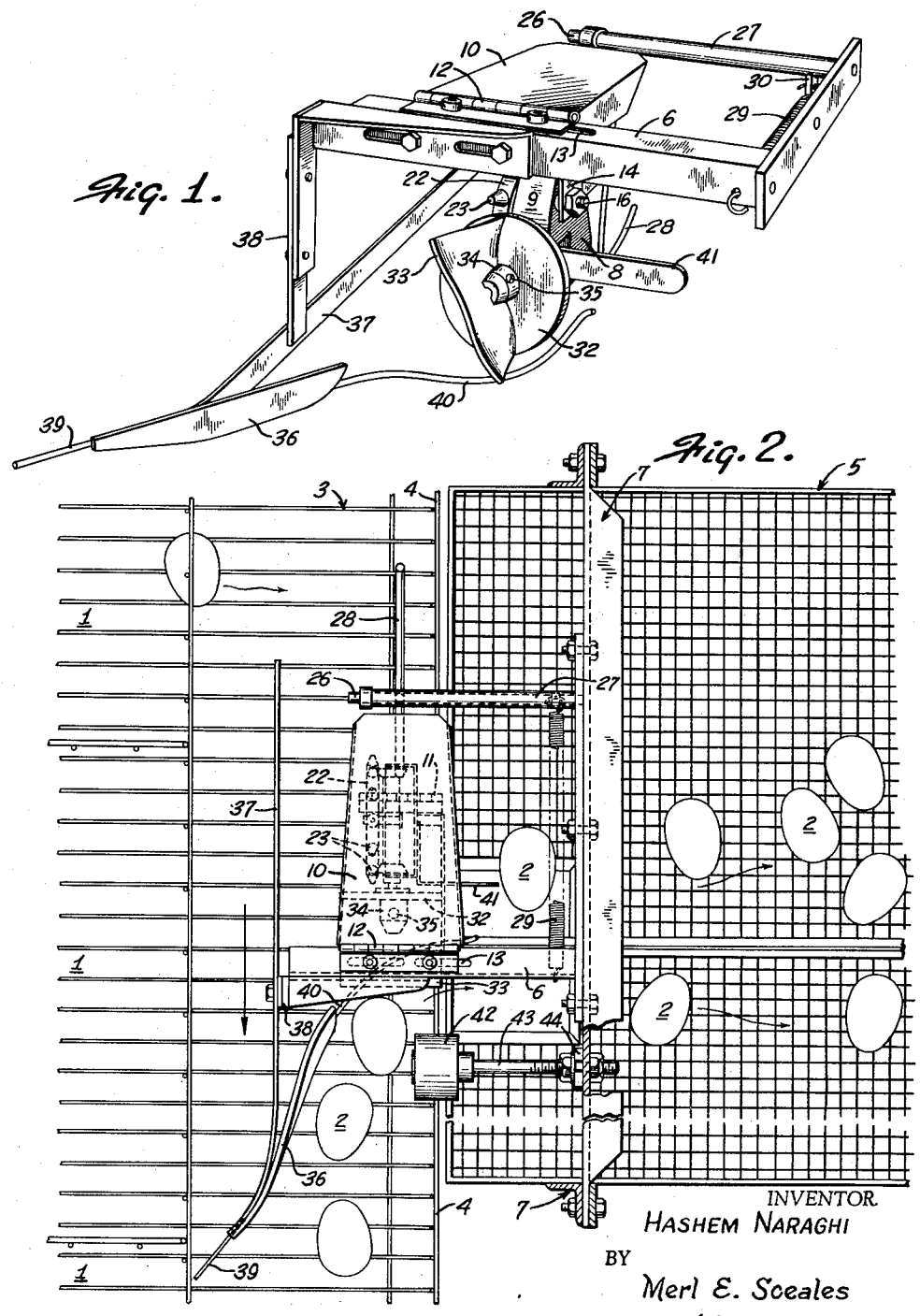
FIGURE 1 is a perspective view of the egg gathering apparatus of the invention.
FIG. 2 is a top plan view showing the egg gathering apparatus, the cages and ledge extending therefrom, and the egg trays to receive the eggs.

Referring to the drawings, there is illustrated one horizontal tier of a battery of wire chicken cages 1 within which laying hens are confined. The eggs 2 laid by such hens roll out of the cages and onto the trough like ledge 3 which extends along the length of cages 1. The ledge 3, as illustrated in FIG. 4, slopes downwardly from the cages and is provided with an upwardly extending outer lip 4 which prevents the eggs 2 from rolling off the ledge.

The cages and their respective ledges are stacked one on the top of the other, so that a battery of laying hens may be confined.

Automatic equipment is provided to feed and water the hens as well as to gather the eggs, the latter egg gathering apparatus being the subject matter of the invention described and claimed herein. The egg gathering equipment is the same for each tier, and therefore, the description hereinafter will only make reference to one of the egg gathering devices driven along one of the wire ledges.

The egg gathering apparatus of the invention is employed ot transfer eggs 2 from ledge 3 to the receiving trays 5. The egg gathering apparatus illustrated in the drawings comrises an L-shaped frame 6, and the foot of the L is bolted to the frame or carriage 7 on which the receiving trays 5 are supported and moved past the cages 1 such as by the drive means described and illustrated in U.S. Patent 2,966,884, issued to the present inventor on January 3, 1961, and incorporated herein by reference. The leg of the L extends over the inner ends of trays 5 and across a portion of ledge 3.

The actuating mechanism of the egg gathering apparatus is protected by a vertical side housing 8 which has side channels 9 and an upper housing 10 which overlies housing 8 and is held in secure engagement with the upper rear portion of housing 8 by the hinge 11. A leaf hinge 12 is provided at the forward end of upper housing 10 and is bolted to the leg of frame 6 within slots 13 in the top of such leg so that the sweep unit may be adjusted sidewise of ledge 3. The housing 8 is also supported from the leg of frame 6 by a vertically extending strap 14 which is bolted to frame 6 by the same bolt securing leaf hinge 12 thereto, and a horizontally extending arm 15 which is secured at one end to strap 14 by the pivotal connection 16 and at the other end to housing 8. Arm 15 is adjustable horizontally. The housing 8 and upper housing 10 can therefore pivot on the connection 16 and the hinge 12.

The actuating mechanism, located within housings 8 and 10, consists of a bearing 17 which is secured to channels 9 of housing 8 and supports at the rear end an idler shaft 18 and the idler gear 19, and at the forward end the driven shaft 20 and driving gear 21. Gears 19 and 21 are driven by the wheel 22 which has the rubber teeth 23 on the outer periphery meshing with ledge 3 and gear teeth 24 on the inside adjacent the outer periphery which mesh with gears 19 and 21. The wheel 22 is rotatably supported on bearing 17 by the pin 25. Teeth 23 are pivoted into such meshing engagement by the weight of the unit in operation when the egg gathering apparatus is moved over ledge 3 due to the pivotal connection 16 and the hinge 11 permitting housing 8 to pivot downwardly.

A fixed stub shaft 26 is secured to the foot of frame 6 rearwardly of the leg of the frame and projects toward cages 1 and overlies ledge 3 in parallel relation to the leg of frame 6. A sleeve 27 is secured on shaft 26 and is free to rotate thereon. A hook-like skid 28 is secured to the outer end of sleeve 27 and extends rearwardly thereof and is biased into engagement with ledge 3 by the spring 29 when the gatherer is in operation. Spring 29, at its forward end, is secured to the leg of frame 6 adjacent to frame 7, and at its rearward end, to a lug 30 on sleeve 27. The upper end of skid 28 has a curved projection 31 which rotates upwardly under the tension of spring 29 when skid 28 is out of engagement with ledge 3 to thereby engage housing 10 and rotate housing 8 and 10 upwardly on hinge 12 and connection 16. Skid 28 moves off the ledge 3 as the egg gatherer rotates around the end of the unit and skid 28 and associated spring 29 thus insure that wheel 22 will pass over the end edge of the ledge on the opposite side of the unit corresponding to ledge 3 before being meshed with such ledge.

The driven shaft 20 extends forwardly of gear 21 and receives the sweep of the invention comprising a generally large circular disc or backing plate 32 and a blade 33 of generally S-shape. The backing plate 32 is secured to shaft 20. A slotted sleeve 34 is located over the outer end of shaft 20 and the slot in the sleeve receives the blade 33 of plastic material or the like. A screw 35 extends through the blade and sleeve to secure the sleeve to shaft 20. The rotation of the blade 33 by wheel 22 through the gear and shaft mechanism described effects sweeping of the eggs lying on ledge 3 ahead of blade 33 into receiving trays 5.

In order to insure that the eggs are guided to blade 33, a guide bar 36 is provided. Guide bar 36 is supported forwardly and angularly of blade 33 and between the cages and blade 33 by a bar 37. The bar 37 extends rearwardly a substantial distance to prevent eggs laid by the hens as the mechanism passes from rolling into the rear portion of the gatherer and to balance the weight of the unit on the forward end. Bar 37 is supported from frame 6 by the right angle support member 38 which is bolted to the leg of frame 6 and contains slots for adjustment of the position of the sweep guide bar 36 horizontally of ledge 3. The bar 36 extends on an angle toward the cages as it projects forwardly from blade 33. A flexible finger 39 is secured to the outer end of bar 36 and engages and dislodges any eggs ahead of bar 36 which may have become lodged against the wire wall between cages adjacent to ledge 3.

Although the sweep or gathering unit moves relatively slowly if the eggs engage backing plate 32, there is a tendency of some of the eggs to break. To overcome this problem, there is provided a guide lifter 40 of a heavy wire or small diameter rod which extends rearwardly from the guide bar 36 and across the front of backing plate 32 about midway of the blade 33. The lifter 40 then is curved upwardly and outwardly directly in front of the right side of the backing plate 32 as may be observed in FIGURE 1, and the outer end portion extends over trays 5. The lifter 40, in general, takes the shape of the ledge 3 across which the lifter extends. The upward curvature of the lifter 40 prevents the eggs 2 from srtiking plate 32 and being crushed thereon. The eggs are engaged by the rotating blade and slowly slide along the guide lifter 40 and are gently raised into the trays 5 by the lifter 40 and the rotation of blade 33. Thus, there is no direct frontal engagement of the eggs 2, but rather, they are always engaged on an angle. The lifter 40 may be provided separate from the guide bar 36 and may be separately secured to frame 6 or may be provided as an extension of guide bar 36.

In the event that the eggs may in some instances ride over lifter 40, a right angle shaped retaining bar 41 is secured to housing 12 to the rear of plate 32 and extends over trays 5 to force such eggs into trays 5.

It is necessary for the efficient transfer of eggs 2 that the blade 33 and the other associated parts of the egg gatherer be maintained in fixed relationship with respect to ledge 3 from which the eggs are transferred. To accomplish this, a roller leveler is provided. The roller leveler consists of a wide rubber roller 42 secured to a shaft 43 which has a horizontally adjustable threaded connection with a vertical bracket 44. Bracket 44 is bolted to frame 7 ahead of the connection of frame 6 to frame 7 and the bracket is slotted for changing the vertical position of the bracket and consequently that of rubber roller 42. Rubber roller 42 rides along the edge 4 of ledge 3 and forces the ledge downwardly. In this manner, any irregularities in the ledge are overcome and the ledge 3 is maintained in fixed level relationship with respect to the sweep blade 33.

A tray 45 is supported on the bar 46 which extends beneath the trays 5, and bar 46 is secured to the rectangular frame 47 which supports the trays 5. Tray 45 extends beneath the egg gatherer and a portion of trays 5, so that in the event that eggs are broken by the gatherer, the tray 45 receives the broken egg and can be readily removed from bar 46 for disposal of any broken eggs.

The combination of the sweep blade, the guide, the lifter and the leveler provides an egg gatherer which reduces egg breakage in an automatic egg gathering operation to a minimum.

Various modes of carrying out the invention are contemplated as being within the scope of the following claims particularly pointing out and distinctly claiming the subject matter which is regarded as the invention.

I claim:

1. Egg gathering apparatus for gathering eggs from a ledge onto which the eggs roll from hens confined in cages adjacent said ledge, which comprises a movable frame mounted adjacent to said ledge, means to drive the frame along said ledge, a tray supported on one side of the frame, an egg gatherer supported on the other side of the frame and overlying said ledge, said egg gatherer comprising a sweep blade adapted to engage the eggs on said ledge and sweep the eggs into said tray, means to rotate said blade as the blade moves over said ledge, and a guide bar supported from the frame and extending on an angle forwardly of and spaced from the blade to substantially pass over the entire upper surface of the ledge and guide eggs to the blade for sweeping into the tray.

2. In egg gathering apparatus for gathering eggs from a ledge onto which the eggs roll from hens confined in cages adjacent said ledge, a movable carriage mounted adjacent to said ledge, means to drive the carriage along said ledge, a receiving tray supported on the carriage at one side of said carriage, a frame secured to the carriage on the other side of said carriage and overlying said ledge, a rotatable sweep blade supported on the frame above said ledge, means to rotate the blade as the blade is moved over said ledge by said carriage, a guide bar supported on the frame and extending angularly ahead of the blade to guide eggs to the blade for sweeping into the tray, and a lifter guide secured to the frame and extending rearwardly of the guide bar and outwardly and upwardly past said blade, said lifter guide throughout its extent conforming in shape to the configuration of said ledge and serving to direct eggs to the tray as the eggs are engaged by said blade.

3. Apparatus, as in claim 2, and a roller leveler secured to said carriage ahead of the sweep blade and riding on the outer edge of said ledge to force the ledge downwardly and maintain a fixed distance between the ledge and the sweep blade.

4. Apparatus, as in claim 2, and a tray supported by the carriage and disposed beneath a portion of the receiving tray and said ledge at the location of the sweep blade to receive any eggs broken in the transfer of the eggs from the ledge to the tray.

5. Apparatus, as in claim 2, and a flexible finger secured to the forward end of the guide bar and extending on an angle forwardly of the guide bar to engage and dislodge eggs failing to roll down said ledge.

6. In egg gathering apparatus having a driven blade member extending from a backing plate to sweep eggs from a cage ledge and into a tray, a frame, and an egg lifter member secured to the frame ahead of said blade and extending over the ledge on an angle toward said blade and thence beneath the blade and upwardly in front of said backing plate, said egg lifter member having in general the shape of said ledge and guiding eggs to the blade and lifting the eggs for discharge into the tray when engaged by said blade to thereby prevent cracking of the eggs by engagement with the backing plate.

7. Apparatus, as in claim 6, and the driven blade member being of S-shape for engagement of the eggs with the tips of the blades.

8. Egg gathering apparatus for gathering eggs from a wire ledge onto which the eggs roll from hens confined in cages adjacent said ledge, which comprises a movable carriage mounted adjacent to said ledge, means to drive the carriage along said ledge, a tray supported on one side of the carriage, an egg gatherer supported on the other side of the carriage and overlying said ledge, said egg gatherer comprising a frame, a housing pivoted to said frame, a teethed wheel supported by the housing and normally placed in engagement with the ledge by the weight of the housing and wheel, a sweep blade extending forwardly of the housing and rotatable to engage the eggs on said ledge and sweep the eggs into said tray, a gear train connecting said wheel and sweep blade to effect rotation of the blade from the wheel as the carriage moves along said ledge, guide means supported from the frame and extending on an angle ahead of the blade to guide eggs to the blade for sweeping into the tray, a skid member pivoted to said frame and having a forward extension removed from the housing when the wheel and skid are in engagement with the ledge, and spring means secured to the skid and said frame to pivot the skid upwardly when out of engagement with said ledge and thereby engage the housing with the skid extension and pivot the housing upwardly as the skid passes off the end edges of the ledge.

References Cited in the file of this patent

UNITED STATES PATENTS

| | | |
|---|---|---|
| 2,314,344 | Gornell | Mar. 23, 1943 |
| 2,966,884 | Naraghi | Jan. 3, 1961 |
| 3,045,612 | Byrnes | July 24, 1962 |